United States Patent

Berman

[15] 3,703,718
[45] Nov. 21, 1972

[54] INFRARED INTRUSION DETECTOR SYSTEM

[72] Inventor: Herbert L. Berman, Los Altos Hills, Calif.

[73] Assignee: Optical Coating Laboratory, Santa Rosa, Calif.

[22] Filed: Jan. 7, 1971

[21] Appl. No.: 104,667

Related U.S. Application Data

[63] Continuation-in-part of Ser. No. 9,315, Feb. 6, 1970, abandoned.

[52] U.S. Cl. .............................. 340/258 D, 250/83.3
[51] Int. Cl. ............................................. H01j 39/00
[58] Field of Search .......... 340/258 R, 258 B, 258 D; 250/83.3

[56] References Cited

UNITED STATES PATENTS 3,475,608  10/1969  Pardes ............... 340/258 D X
3,480,775  11/1969  Osborne ............. 340/258 D X

*Primary Examiner*—John W. Caldwell
*Assistant Examiner*—Michael Slobasky
*Attorney*—Flehr, Hohbach, Test, Albritton & Herbert

[57] ABSTRACT

Infrared intrusion detector system utilizing a single sensing element and optical means for focusing radiation from one or more discrete fields of view onto the sensing element. An amplifier tuned to have a frequency response corresponding to the walking speed of an intruder amplifies the signal from the sensing element and provides means for discriminating between changes in infrared radiation due to the presence of an intruder and gradual temperature changes such as room or ambient changes.

11 Claims, 14 Drawing Figures 3,703,718
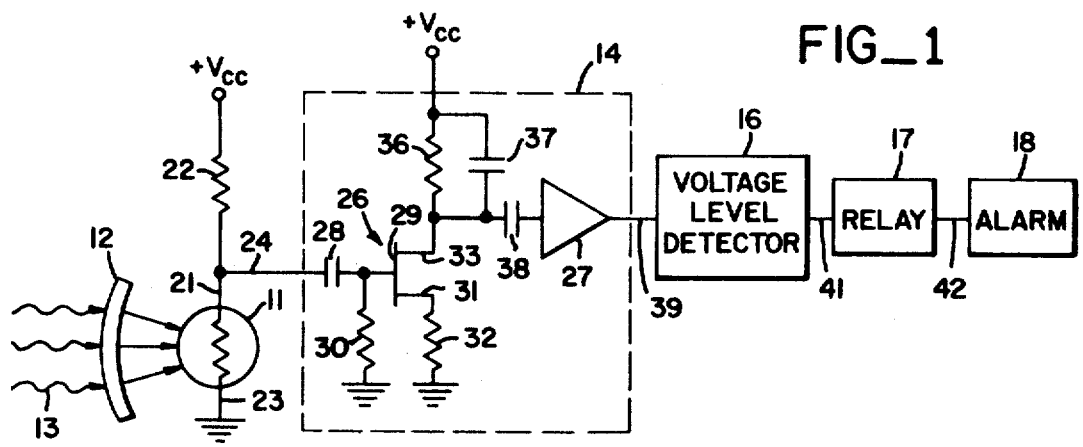
FIG_1
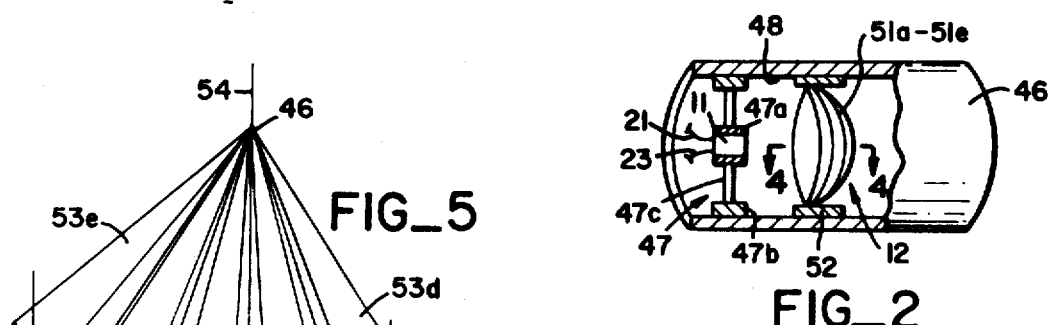
FIG_5  FIG_2
FIG_3
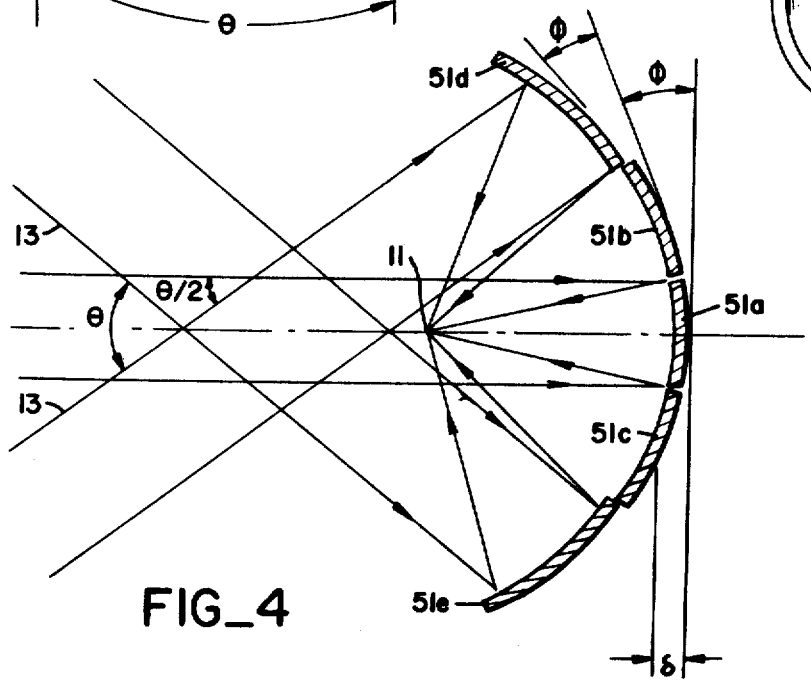
FIG_4

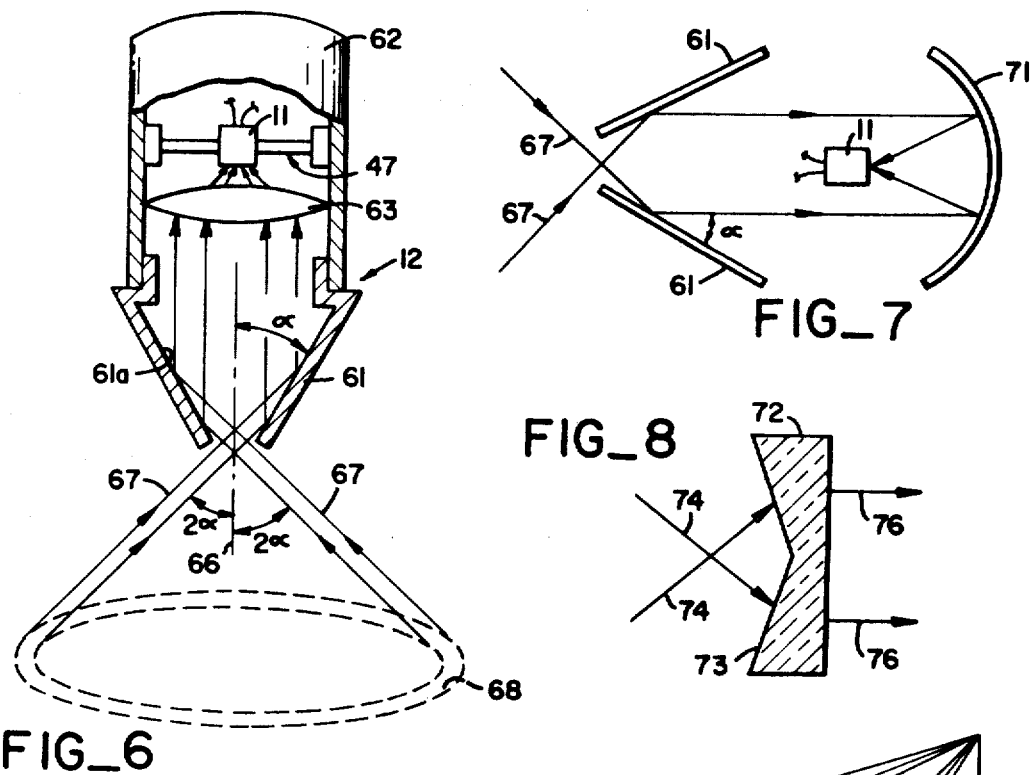
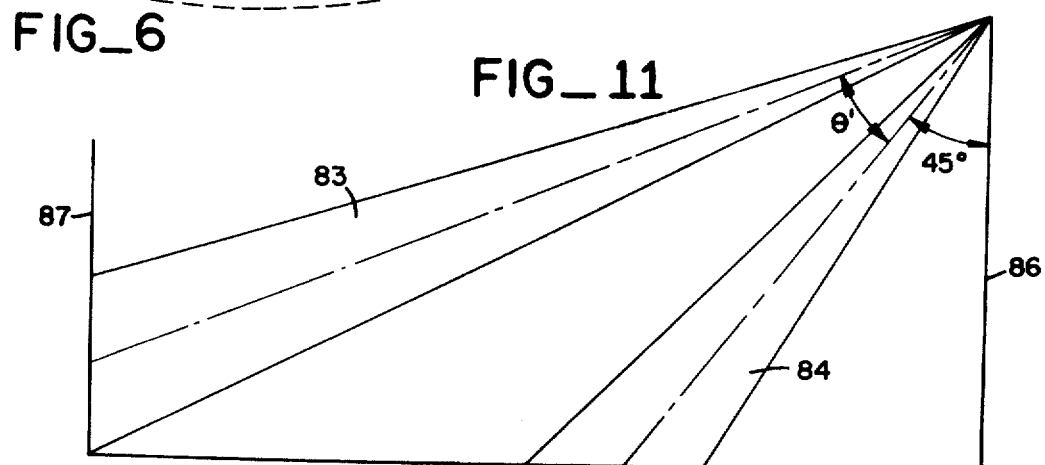
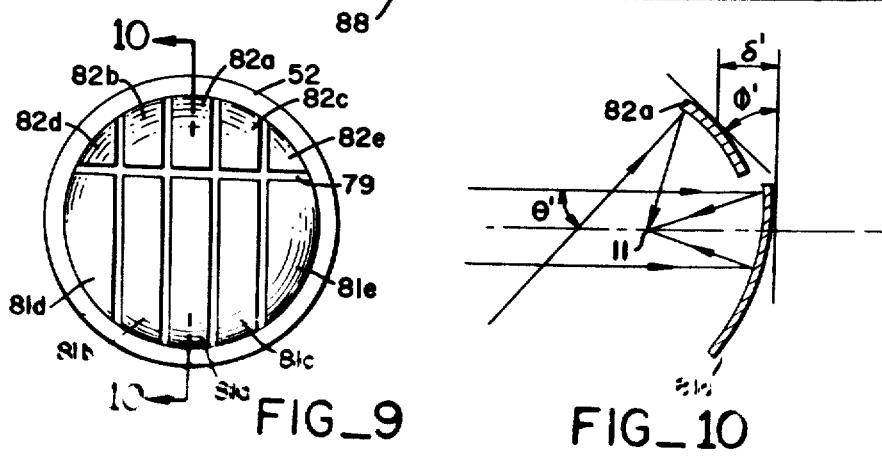

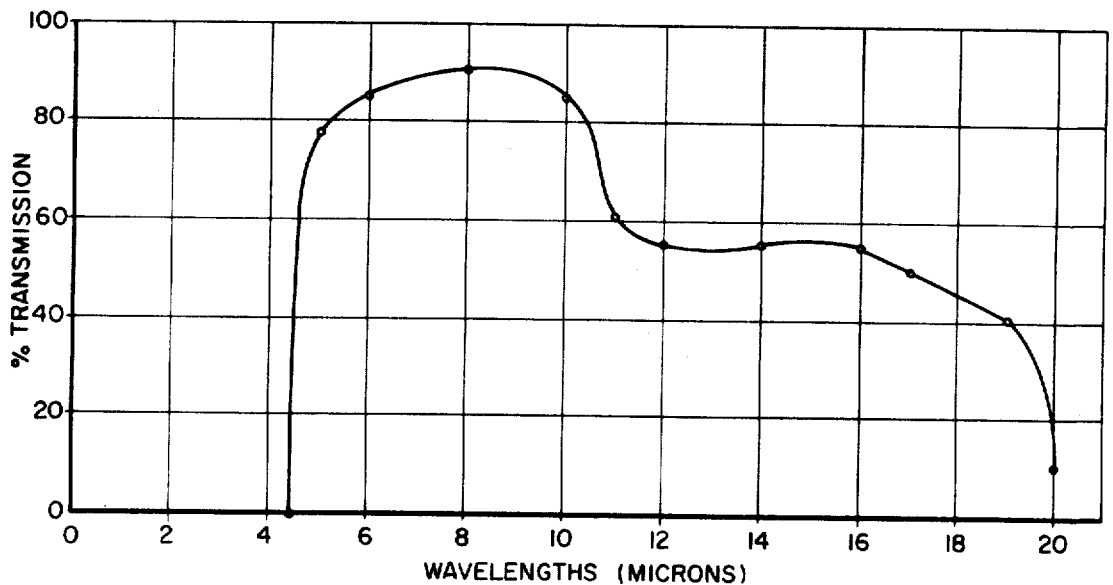
FIG_14
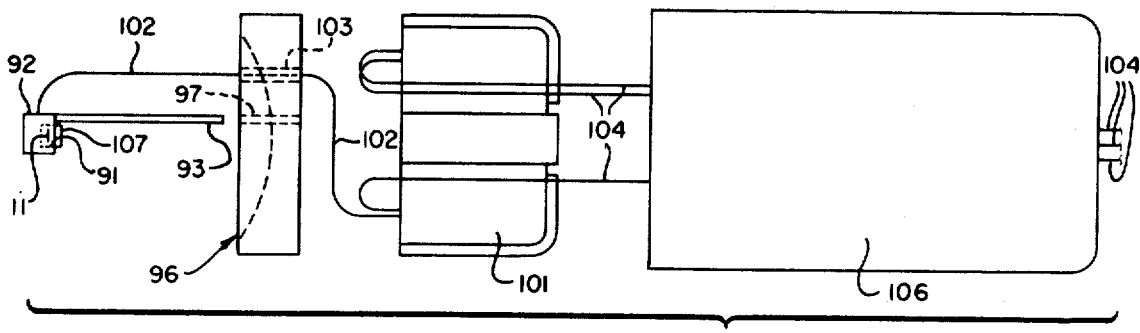
FIG_12
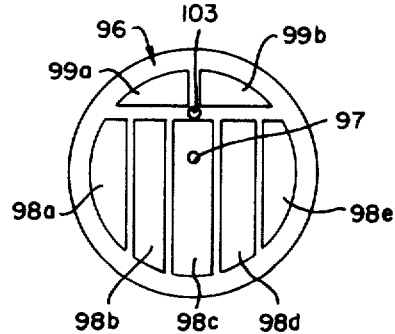
FIG_13

INFRARED INTRUSION DETECTOR SYSTEM

CROSS-REFERENCE TO RELATED APPLICATION

This application is a continuation-in-part of application Ser. No. 9315, filed Feb. 6, 1970, now abandoned and assigned to the assignee of the present invention.

SUMMARY AND OBJECTS OF THE INVENTION

The intrusion detector system of the present invention utilizes a single infrared sensing element and optical means for focusing infrared radiation from a discrete field of view or a plurality of such fields onto the sensing element. The output of the sensing element is applied to a tuned amplifier having a frequency response corresponding to the walking speed of an intruder. Thus, the system is responsive to changes in infrared radiation due to the movement of the intruder through the fields of view but is not affected by gradual changes within the fields, such as a change in room or ambient temperature. In one embodiment, which is particularly adapted for mounting in the corner of a room, the sensing element and optical means cover a plurality of spaced apart sector-shaped fields. Another embodiment is particularly adapted for mounting in the ceiling and has a conically divergent annular field of view particularly suitable for covering the perimeter of a room.

It is in general an object of the present invention to provide a new and improved system for detecting the presence of an intruder by sensing the infrared radiation from his body.

Another object of the invention is to provide a system of the above character which can be economically manufactured and operated and which is suitable for use in homes and offices.

Another object of the invention is to provide a system of the above character which is responsive to the movement of an intruder but is not affected by gradual changes such as changes in room or ambient temperature.

Another object of the invention is to provide a system of the above character having a plurality of discrete fields of view adapted for covering substantially the entire area of a room.

Another object of the invention is to provide a system of the above character having a field of view particularly adapted for covering the perimeter of a room.

Another object of the invention is to provide a system of the above character which can be used for protecting more than a single room.

Another object of the invention is to provide a system of the above character which includes a filter to prevent false alarms due to reflected sunlight and light from other sources such as incandescent lamps and fluorescent lights.

Additional objects and features of the invention will be apparent from the following description in which the preferred embodiments are set forth in detail in conjunction with the accompanying drawing.

BRIEF DESCRIPTION OF THE DRAWING

FIG. 1 illustrates schematically one embodiment of an infrared intrusion detector system incorporating the present invention.

FIG. 2 is a side elevational view, partially sectioned, of one embodiment of a sensing head incorporating the present invention and having a segmented spherical mirror for reflecting infrared rays onto a sensing element.

FIG. 3 is a front elevational view of the segmented spherical mirror of the embodiment shown in FIG. 2.

FIG. 4 is a sectional view taken along plane 4—4 in FIG. 2.

FIG. 5 is a perspective view illustrating the fields of view covered by the embodiment shown in FIG. 2 when it is mounted in a corner of a room.

FIG. 6 is a side elevational view, partially sectioned, of an embodiment of the invention having a conical mirror and a lens for directing infrared rays from a conically diverging annular path onto a sensing element.

FIG. 7 illustrates schematically an embodiment of the invention having conical and spherical mirrors for reflecting infrared rays from a conically diverging annular path onto a sensing element.

FIG. 8 is a cross-sectional view of a plano-conically concave lens which can be substituted for the conical mirror in the embodiments shown in FIGS. 6 and 7.

FIG. 9 is a front elevational view of a segmented spherical mirror which has been divided into both vertical and horizontal segments.

FIG. 10 is a vertical sectional view taken along plane 11-11 in FIG. 9.

FIG. 11 is a schematic illustration of the vertical fields of view covered by the spherical mirror shown in FIGS. 9 and 10 when it is mounted in a corner of a room.

FIG. 12 is an exploded view of one embodiment of a sensing head incorporating the present invention and having a filter to prevent flase alarms due to reflected sunlight and light from other sources such as incandescent lamps and fluorescent lights.

FIG. 13 is a front elevational view of a segmented spherical mirror which can be used in he embodiment shown in FIG. 12.

FIG. 14 is a graphical representation of the characteristics of a preferred filter for use in the embodiment shown in FIG. 12.

DESCRIPTION OF THE PREFERRED EMBODIMENT

A shown in FIG. 1, the intrusion detector system includes a sensing element 11, optical means 12 for focusing infrared radiation illustrated by rays 13 onto the sensing element, a tuned amplifier 14, a voltage level detector 16, a relay 17, and an alarm device 18.

The sensing element 11 is adapted for producing an electrical signal responsive to the level of infrared radiation impinging thereon. In the preferred embodiment, this element is a thermistor bolometer having a resistance dependent upon the level of impinging radiation. If desired, other types of infrared sensing elements can be utilized.

One terminal 21 of the sensing element 11 is connected to a constant voltage source $+V_{cc}$ through a resistor 22. The other terminal 23 of the sensing element is connected to ground. Thus, it can be seen that the sensing element 11 and resistor 22 are connected as a voltage divider between the source $+V_{cc}$ and ground, The voltage at the terminal 21 is proportional to the resistance of the sensing element and is, therefore, dependent upon the level of radiation impinging upon this element.

The signal appearing at the terminal 21 is applied to the input of the amplifier 14 through a circuit 24. This amplifier includes a field effect transistor (FET) 26 and an operational amplifier 27. The input signal is coupled through a capacitor 28 to the gate 29 of the FET 26. A resistor 30 is connected between the gate 29 and ground to provide proper operation of the FET. The source 31 is connected to ground through a resistor 32, and the drain 33 is connected to the source $+V_{cc}$ through a resistor 36 shunted by a capacitor 37. The output of the FET is taken from the drain 33 and is coupled to the operational amplifier 27 through a capacitor 38.

The amplifier 14 is tuned to have a frequency response corresponding to the rate at which a person walks. The low frequency response is limited by the coupling capacitors 28 and 38, and the high frequency response is limited by the bypass capacitor 37. In the preferred embodiment, these capacitors are chosen to provide a passband on the order of 0.2 to 3 hertz. This frequency range has been found to be particularly suitable for discriminating between changes in the level of infrared radiation due to an intruder and gradual changes such as room or ambient temperature changes. Additional tuning can be provided by the operational amplifier 27. The field effect transistor in the input stage of the amplifier 14 has a low noise figure which has been found to be desirable in view of the relatively low frequencies to which the amplifier is tuned. If desired, another type of low noise transistor, such as a bipolar transistor, could be used in place of the FET.

The output of the amplifier 14 is connected to the voltage level detector 16 through a circuit 39. This level detector is of conventional design and is adapted for firing when the voltage at its input reaches a predetermined level. In the preferred embodiment, this level is made adjustable to provide means for adjusting the sensitivity of the overall system.

The output of the level detector is connected to the relay 17 through a circuit 41, and the relay is connected for controlling the alarm 18 through a circuit 42. The relay and alarm are of conventional design and can include any suitable alarm device, such as an audio or visual warning device. Alternatively, if desired, the output of the amplifier 14 can be applied to a monitoring device such as a conventional chart recorder.

Operation of the system shown in FIG. 1 can be described briefly as follows. Initially let it be assumed that there is no intruder in the field of view defined by the optical means 12. At this time, the signal at the terminal 21 of the sensing element corresponds to the normal level of radiation in the field. In the absence of an intruder, this signal remains relatively constant and is discriminated against by the tuned amplifier 14. When an intruder enters the field of view, the level of radiation changes suddenly, producing a corresponding change in the signal at the input of the amplifier. This transient signal falls within the passband of the amplifier, and when the output of the amplifier reaches the predetermined level, the level detector 16 fires, tripping the relay 17 and energizing the alarm 18.

FIG. 2 illustrates one embodiment of a sensing head which can be utilized in the system shown in FIG. 1. This sensing head includes a tubular member 46 in which the sensing element 11 and optical means 12 are mounted. The sensing element 11 is mounted on the axis of the tubular member by means of a mounting bracket 47. This mounting bracket includes a hub portion 47a in which the sensing element 11 is disposed, and an annular outer rim 47b adapted for engaging the inner surface 48 of the tubular member 46. A plurality of spokes 47c extend between the hub portion and the outer rim. The mounting bracket 47 is located toward the front of the tubular member and is held in place by conventional means, such as cementing.

In the embodiment shown in FIG. 2, the optical means 12 comprises a plurality of reflective members 51a–51 mounted behind the sensing element 11. These reflective members provide means for focusing infrared radiation from a plurality of discrete fields of view onto the sensing element 11. The reflective members have a generally spherical contour, and they are conveniently fabricated by cutting segments from a spherical mirror. As can best be seen in FIG. 3, these segments are formed by cutting the mirror along a plurality of planes which are parallel to each other and to the axis of the mirror. In order to provide substantially equal intensity from each of the fields of view, it is desirable that the reflective members or mirror segments all be of substantially equal area. If desired, the reflective members can be individually molded of a suitable material such as plastic and coated with chrome, aluminum, or another material having a relatively high reflectivity in the infrared region.

The reflective members 51a-51e are mounted in an annular mounting ring 52 which slidably engages the inner surface 48 of the tubular member 46. The reflective members can be secured to the mounting ring by any suitable means such as cementing, and the mounting ring can likewise be held in place in the tubular member by conventional means such as cementing or screws. As can be seen in FIGS. 3 and 4, the reflective members are mounted in a diametrically spaced apart manner. Each of the members is inclined at an angle $\Phi$ with respect to the members adjacent to it, and each is displaced axially from its adjacent members by a distance $\Phi$. This arrangement provides a number of spaced apart sector-shaped fields of view corresponding to the number of reflective members. The overall field of view $A$ is dependent upon the number of reflective members 51 and the angle of inclination $\Phi$. To a close approximation, $A = (n-1)\Phi$, where $n =$ the number of reflective members. These reflective members are separated from the sensing element 11 by a distance corresponding to the focal length of the spherical mirror from which they are fabricated. The axial displacement $\Phi$ is chosen to provide proper focusing of the rays from each of the reflective members on the sensing element.

Operation of the sensing head shown in FIGS. 2–4 can now be described briefly as follows. In the absence of an intruder, the quiescense signal at the input of the amplifier 14 has a substantially constant magnitude. When an intruder enters the room, each time he passes into or out of one of the discrete fields, the level of radiation in that field changes suddenly. These sudden changes produce a signal which passes through the amplifier to actuate the alarm. This system having a plurality of discrete fields of view has been found to be substantially more reliable than a system having a single field of view since the change in the level of infrared radiation produced by an intruder entering or leaving a field is substantially greater than the change produced by movement of the intruder within the field.

If desired, a system similar to that illustrated in FIGS. 2–5 could be provided utilizing refractive members rather than reflective members.

FIG. 6 illustrates an embodiment of the invention which is particularly adapted for mounting in the ceiling of a room to provide coverage of the perimeter of the room. This embodiment includes a truncated conical mirror 61 having a reflective inner surface 61a. The conical mirror is mounted in the outer end of a tubular member 62. The sensing element 11 is mounted in the tubular member 62 by means of a mounting bracket 47 similar to that shown in FIG. 2 and described hereinbefore. A lens 63 is disposed intermediate the conical mirror and the sensing element.

Operation of the embodiment shown in FIG. 6 can be described briefly as follows. It is a property of a conical mirror that only those rays striking the reflective surface at a single predetermined angle are reflected parallel to the axis of the mirror. This angle generally corresponds to the half-angle of the conical mirror; that is, it is equal to the angle between the reflective surface and the axis of the mirror. In FIG. 6, the reflective surface 61a is inclined at an angle $\alpha$ with respect to the axis 66 of the mirror. Thus, only those rays 67 which strike the reflective surface 61a at an angle equal to $\alpha$ are reflected parallel to the axis 66. The lens 63 focuses the parallel rays onto the sensing element 11. The locus of the incoming rays 67 which are reflected by the mirror and focused upon the sensing element is the surface of a cone having an angle twice the angle of the conical mirror 61. This locus has a width corresponding to the length of the reflective surface 61a. This embodiment has a field of view in the form of an annular path 68 in a plane perpendicular to the axis of the conical mirror. This path increases in diameter as the distance from the mirror increases and can be thought of as a conically divergent annular path. This path can be made to correspond with the perimeter of a floor area to be protected by proper sizing and location of the mirror. The movement of an intruder across the path 68 produces a substantial change in the level of radiation impinging upon the sensing element 11, and this change produces an electrical signal which actuates the alarm in the manner described hereinbefore. Since only the small end of the conical mirror needs to be exposed to the protected area, this embodiment can be readily concealed in the ceiling of a room.

The embodiment illustrated in FIG. 7 is similar to that illustrated in FIG. 6 except that a spherical mirror 71 has been substituted for the lens 63. This mirror is mounted behind the sensing element 11 and reflects the parallel rays from the conical mirror 61 onto the sensing element.

FIG. 8 illustrates a lens 72 which can be substituted for the conical mirror 61 in the embodiment shown in FIGS. 6 and 7. This lens has a conically concave surface 73 adapted for deflecting rays 74 which strike the surface at a predetermined angle into rays 76 parallel to the axis of the lens. Either a lens such as the lens 63 or a mirror such as the mirror 71 can be utilized with the lens 73 for focusing the rays 76 onto the sensing element 11.

FIGS. 9–11 illustrate an alternate form of a segmented mirror which can be used as the optical means 12 in the sensing head shown in FIG. 2. This alternate embodiment is generally similar to the segmented mirror illustrated in FIGS. 3 and 4 in that it includes a plurality of horizontally spaced apart, vertically extending sections similar to the reflective members 51a–51e. The mirror shown in FIG. 9 is also segmented horizontally along a plane 79. Thus, each of the vertical sections is divided into upper and lower segments. The lower segments are designated by the reference numerals 81a–81e, and the upper segments are designated 82a–82e.

As can best be seen in FIG. 10, each of the upper segments 82a–82e is inclined at an angle $A'$ with respect to the lower segments 81a–81e below it. In addition, each of the upper segments is displaced axially from its corresponding lower segment by a distance $\delta'$. As illustrated in FIG. 11, the separation of the mirror into upper and lower segments provides two vertically spaced apart discrete fields of view 83, 84 for each vertical section of the mirror. These fields of view are separated by an angle $A'$ which is determined by and substantially equal to the angle of inclination $\delta'$ between the upper and lower segments. The axial displacement $\delta'$ is chosen so that the rays from each of the fields of view 83, 84 are focused on the sensing element 11.

If desired, each of the vertical sections can be divided into additional segments to provide additional vertical spaced-apart fields of view. The two vertically spaced apart fields 83, 84 produced by the mirror illustrated in FIGS. 9 and 10 have been found to give adequate protection for most rooms. FIG. 11 illustrates the vertical fields of view provided by this mirror in a room having end walls 86, 87 and a floor 88. The upper field of view 83 is produced by the lower segments of the mirror, and the lower field 84 is produced by the upper segments. For a given mirror and a given room, the location of the fields of view is, of course, dependent upon the location and orientation of the mirror. In the room illustrated in FIG. 11, the mirror is mounted on the end wall 86 at a distance above the floor 88 equal to approximately forty percent of the distance between the end walls 86, 87. The mirror has an angle of inclination $\Phi'$ on the order of 30°, and the axis of the upper segments is inclined with respect to the end wall 86 by an angle on the order of 45°. As can be seen from the drawing, the upper field of view 83 provides coverage for the full length of the room, although this coverage is better toward the end wall 87. The lower field of view 84 provides protection in the region under the field of view 83 and proximate to the end wall 86 which would not otherwise be covered.

FIG. 12 illustrates an embodiment of a sensing head which is provided with a filter to prevent false alarms due to reflected sunlight and light from other sources such as incandescent lamps and fluorescent lights. In this embodiment, the sensing element 11 is mounted in a recessed area or cavity 91 which is formed in the head 92 of a mounting post 93. As in the previous embodiments, the sensing element 11 is mounted at the focus of a segmented spherical mirror 96, with the post 93 being mounted in a mounting hole 97 which is provided in the mirror. The mirror 96 is similar to the segmented mirror shown in FIG. 9. This mirror includes 5 large spaced apart segments 98a-98e which provide the primary fields of view and two small segments 99a and 99b which provide secondary fields of view spaced apart from the primary field.

A module 101 containing the tuned amplifier 14 and the level detector 16 is mounted behind the spherical mirror 96. The sensing element 11 is connected to the module by means of leads 102 which pass through an opening 103 in the mirror. Additional leads 104 are provided for supplying power to the module and for connecting the output of the level detector 16 to the relay 17.

The sensing element, spherical mirror and module are all mounted in a cylindrical housing 106. The leads 104 pass through an opening in the housing for connection to the remainder of the circuit.

A filter element 107 is provided between the sensing element 11 and the spherical mirror 96. As illustrated in FIG. 12, this filter element is mounted over the cavity 91 in the post head 92. Thus, all energy reaching the sensing element must pass through this filter. FIG. 14 shows the characteristics of a presently preferred filter for this application. This filter passes radiation having a wave length on the order of 4.5 to 20 microns, with a peak response at approximately 8 to 10 microns. The filter can be constructed in a conventional manner such as by depositing thin layers of dislectric materials on a germanium substrate. The filter has been found to be very effective in passing the desired infrared radiation and preventing false alarm by blocking spurious light such as reflected sunlight and light from incandescent lamps and fluorescent lights.

With each of the embodiments described hereinbefore, if protection of more than one room is desired, a plurality of sensing elements 11 can be connected to a single amplifier 14. Suitable optical means 12 must, of course, be provided for each of these sensing elements.

It is apparent from the foregoing that a new and improved infrared intrusion detector system has been provided. While only the presently preferred embodiments have been described herein, as will be apparent to those familiar with the art, certain changes and modifications can be made without departing from the scope of the invention as defined by the following claims.

I claim:

1. In an infrared intrusion detector system, an infrared sensing element adapted for producing an electrical signal corresponding to the level of the infrared radiation impinging on said element, a plurality of spaced apart reflective surfaces facing the same general direction disposed in proximity to said sensing element for gathering infrared radiation from a plurality of discrete spaced apart fields of view and focusing said radiation on said sensing element, and signal conditioning means connected for receiving the electrical signal from said sensing element, said signal conditioning means having a frequency response corresponding to the walking speed of a human being and being adapted for producing an alarm signal in response to the movement of an intruder across a boundary of one of said discrete fields of view.

2. An intrusion detector system as in claim 1 together with filter means disposed between said reflective surfaces and said sensing element, said filter means permitting only infrared radiation of predetermined wavelength to reach said sensing element.

3. An intrusion detector system as in claim 2 wherein said filter means has a pass band on the order of 4.5 to 20 microns.

4. In an infrared intrusion detector system, an infrared sensing element adapted for producing an electrical signal corresponding to the level of infrared radiation impinging on said element, a plurality of spaced apart spherical mirror segments disposed in proximity to said sensing element for gathering infrared radiation from a plurality of discrete spaced apart fields of view and focusing said radiation on said sensing element, said mirror segments being displaced axially and inclined with respect to each other to form first and second sets of horizontally spaced apart fields of view, said first and second sets being vertically spaced apart from each other, and signal conditioning means connected for receiving the electrical signal from said sensing element, said signal conditioning means having a frequency response corresponding to the walking speed of a human being and being adapted for producing an alarm signal in response to the movement of an intruder across a boundary of one of said discrete fields of view.

5. An intrusion detector system as in claim 4 wherein each of the reflective surfaces in said first set is inclined at an angle on the order of 18° relative to the surface adjacent thereto.

6. An intrusion detector system as in claim 4 together with filter means disposed between said mirror segments and said sensing element, said filter means permitting only infrared radiation of predetermined wavelength to reach said sensing element.

7. In an infrared intrusion detector system, a sensing element adapted for producing an electrical signal corresponding to the level of infrared radiation impinging thereon, conical optical means proximate said sensing element for collecting infrared radiation from an annular field of view and directing said radiation into rays parallel to the axis of said conical means, means for focusing the parallel rays from said conical optical means onto said sensing element, and signal conditioning means connected for receiving the electrical signal from said sensing element, said signal conditioning means having a frequency response corresponding to the walking speed of a human being and being adapted for producing an alarm signal in response to the movement of an intruder across a boundary of said annular field of view.

8. An intrusion detector system as in claim 7 wherein said conical optical means comprises a truncated conical mirror disposed between said sensing element and said field of view, the smaller end of said conical mirror facing toward said field of view.

9. An intrusion detector system as in claim 7 wherein said conical optical means comprises a lens having a generally conical refracting surface disposed between said sensing element and said field of view.

10. In an intrusion detector system, a generally cylindrical housing having an open end, an infrared sensing element adapted for producing an electrical signal corresponding to the level of infrared radiation impinging on said element, means mounting said element on the axis of said cylindrical housing at the open end of said housing, said element facing away from said open end, a plurality of spherical mirror segments mounted within said housing facing said open end, said segments being displaced axially and inclined relative to each other for gathering infrared radiation from a plurality of spaced apart discrete fields of view and focusing said radiation on said sensing element.

11. An intrusion detector system as in claim 10 together with filter means disposed between said sensing element and said spherical mirror segments, said filter means permitting only infrared radiation of predetermined wavelength to reach said sensing elements.

* * * * *

REEXAMINATION CERTIFICATE (4th)

United States Patent [19]
Berman

[11] B1 3,703,718

[45] Certificate Issued Apr. 13, 1982

[54] INFRARED INTRUSION DETECTOR SYSTEM

[75] Inventor: Herbert L. Berman, Los Altos Hills, Calif.

[73] Assignee: Hoermann Corporation U.S.A., Mountain View, Calif.

Reexamination Request
No. 90/000,021, Jul. 9, 1981

Reexamination Certificate for:
 Patent No.: 3,703,718
 Issued: Nov. 21, 1972
 Appl. No.: 104,667
 Filed: Jan. 7, 1971

Related U.S. Application Data

[63] Continuation-in-part of Ser. No. 9,315, Feb. 6, 1970, abandoned.

[51] Int. Cl.³ .................... H01J 39/00; G08B 13/18
[52] U.S. Cl. .................................. 340/567; 340/600
[58] Field of Search ........................... 340/567, 600

[56] References Cited

U.S. PATENT DOCUMENTS

| | | |
|---|---|---|
| 1,193,999 | 8/1916 | Dixon. |
| 2,037,191 | 4/1936 | Backer .................. 250/41.5 |
| 2,082,941 | 6/1937 | Burnside ................ 250/41.5 |
| 2,198,725 | 4/1949 | Smith ...................... 250/83 |
| 3,036,219 | 5/1962 | Thompson ............... 250/220 |
| 3,253,150 | 5/1966 | Farmer ................... 250/83.3 |
| 3,325,789 | 6/1967 | Glenn ..................... 340/173 |
| 3,454,767 | 7/1969 | Stevens .................. 250/83.3 |
| 3,476,948 | 11/1969 | Mengers ................. 250/224 |
| 3,631,434 | 12/1971 | Schwarz ................. 340/228 |

OTHER PUBLICATIONS

Article from *AEROSPACE TECHNOLOGY*, "Military Intrusion Detector Becomes Commercial Spin-Off," Mar. 11, 1968, pp. 30–31.

*Primary Examiner*—Glen R. Swann, III

[57] ABSTRACT

Infrared intrusion detector system utilizing a single sensing element and optical means for focussing radiation from one or more discrete fields of view onto the sensing element. An amplifier tuned to have a frequency response corresponding to the walking speed of an intruder amplifies the signal from the sensing element and provides means for discriminating between changes in infrared radiation due to the presence of an intruder and gradual temperature changes such as room or ambient changes.

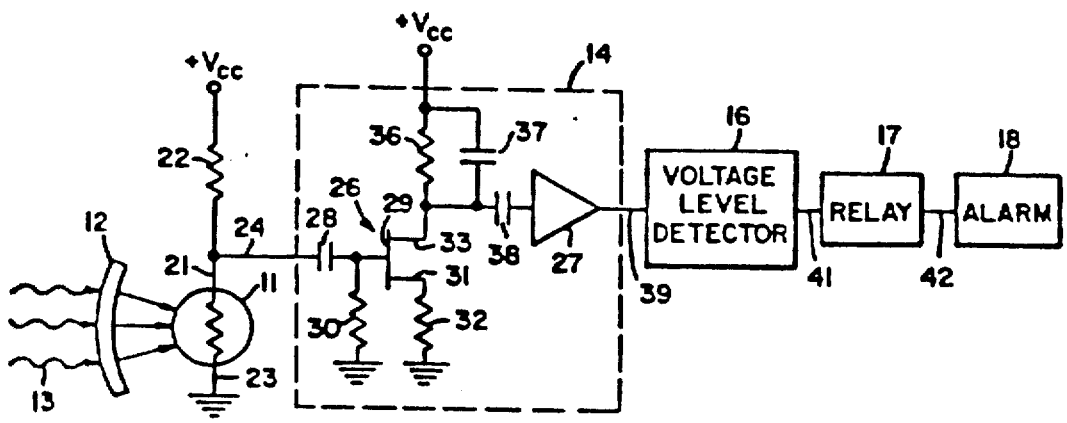

REEXAMINATION CERTIFICATE ISSUED UNDER 35 U.S.C. 307

THE PATENT IS HEREBY AMENDED AS INDICATED BELOW

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN

Column 4, lines 35–60:

The reflective members 51a–51e are mounted in an annular mounting ring 52 which slidably engages the inner surface 48 of the tubular member 46. The reflective members can be secured to the mounting ring by any suitable means such as cementing, and the mounting ring can likewise be held in place in the tubular member by conventional means such as cementing or screws. As can be seen in FIGS. 3 and 4, the reflective members are mounted in a diametrically spaced apart manner. Each of the members is inclined at an angle Φ with respect to the members adjacent to it, and each is displaced axially from its adjacent members by a distance [Φ] δ. This arrangement provides a number of spaced apart sector-shaped fields of view corresponding to the number of reflective members. The overall field of view A is dependent upon the number of reflective members 51 and the angle of inclination Φ. To a close approximation, A=(n-1) Φ, where n=the number of reflective members. These reflective members are separated from the sensing element 11 by a distance corresponding to the focal length of the spherical mirror from which they are fabricated. The axial displacement [Φ] δ is chosen to provide proper focusing of the rays from each of the reflective members on the sensing element.

AS A RESULT OF REEXAMINATION, IT HAS BEEN DETERMINED THAT:

The patentability of claims 1–6, 10, and 11 is confirmed.

Claims 7–9, having been finally determined to be unpatentable, are cancelled.

New claims 12 and 13 are added and determined to be patentable.

*12. In an infrared intrusion detector system, a sensing element adapted for producing an electrical signal corresponding to the level of infrared radiation impinging thereon, conical optical means proximate said sensing element for collecting infrared radiation from an annular field of view and directing said radiation into rays parallel to the axis of said conical means, said conical optical means comprising a truncated conical mirror disposed between said sensing element and said field of view, the smaller end of said conical mirror facing toward said field of view, means for focusing the parallel rays from said conical optical means onto said sensing element, and signal conditioning means connected for receiving the electrical signal from said sensing element, said signal conditioning means having a frequency response corresponding to the walking speed of a human being and being adapted for producing an alarm signal in response to the movement of an intruder across a boundary of said annular field of view.*

*13. In an infrared intrusion detector system, a sensing element adapted for producing an electrical signal corresponding to the level of infrared radiation impinging thereon, conical optical means proximate said sensing element for collecting infrared radiation from an annular field of view and directing said radiation into rays parallel to the axis of said conical means, said conical optical means comprising a lens having a generally conical refracting surface disposed between said sensing element and said field of view, means for focusing the parallel rays from said conical optical means onto said sensing element, and signal conditioning means connected for receiving the electrical signal from said sensing element, said signal conditioning means having a frequency response corresponding to the walking speed of a human being and being adapted for producing an alarm signal in response to the movement of an intruder across a boundary of said annular field of view.*

* * * * *